(12) United States Patent
Miyoshi

(10) Patent No.: US 10,302,899 B2
(45) Date of Patent: May 28, 2019

(54) ZOOM-TYPE LENS BARREL AND IMAGE PICKUP APPARATUS

(71) Applicant: CANON KABUSHIKI KAISHA, Tokyo (JP)

(72) Inventor: Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/453,563

(22) Filed: Mar. 8, 2017

(65) Prior Publication Data

US 2017/0261722 A1  Sep. 14, 2017

(30) Foreign Application Priority Data

Mar. 9, 2016 (JP) ................... 2016-045642
Nov. 9, 2016 (JP) ................... 2016-218973

(51) Int. Cl.
*G02B 7/02* (2006.01)
*G02B 7/04* (2006.01)
(Continued)

(52) U.S. Cl.
CPC ............... *G02B 7/10* (2013.01); *G02B 7/021* (2013.01); *G02B 7/04* (2013.01); *G02B 7/102* (2013.01);
(Continued)

(58) Field of Classification Search
CPC ........ G02B 7/021; G02B 7/023; G02B 7/026; G02B 7/04; G02B 7/08; G02B 7/10; G02B 7/102; G02B 13/20; G02B 15/10; G02B 15/163; G02B 27/021; G02B 27/0068; G02B 7/022; G02B 7/09; G02B 15/14; G02B 15/15; G03B 5/02; G03B 17/00; G03B 3/10; G03B 5/00; G03B 17/04; H04N 5/2251; H04N 5/23287
(Continued)

(56) References Cited

U.S. PATENT DOCUMENTS 5,764,937 A * 6/1998 MacHida ............... G03B 17/04
396/144
6,636,362 B2 * 10/2003 Nomura ................. G02B 7/102
359/700
(Continued)

FOREIGN PATENT DOCUMENTS

JP  2007-271649 A  10/2007
JP  2015-004759 A  1/2015

*Primary Examiner* — Loha Ben
(74) *Attorney, Agent, or Firm* — Cowan, Liebowitz & Latman, P.C.

(57) ABSTRACT

A lens barrel which is miniaturized without complicating control over a drive unit which moves a plurality of optical members in a direction of an optical axis. A cam member is cam-engaged with each of a first optical member and a second optical member which move in the direction of the optical axis. The cam member is rotated about an axis parallel to the optical axis by a cam action of the cam member and the first optical member, which is driven to move in the direction of the optical axis by a linear actuator. Rotation of the cam member causes the second optical member to move in the direction of the optical axis due to a cam action of the second optical member and the cam member. The axis is arranged at an opposite position to the linear actuator with the optical axis as a center.

18 Claims, 14 Drawing Sheets

(51) Int. Cl.
*G02B 7/09* (2006.01)
*G02B 7/10* (2006.01)
*G02B 15/14* (2006.01)
*G03B 17/00* (2006.01)

(52) U.S. Cl.
CPC .............. *G02B 15/14* (2013.01); *G03B 17/00* (2013.01); *G02B 7/023* (2013.01); *G02B 7/09* (2013.01)

(58) Field of Classification Search
USPC ....... 359/694–704, 817, 819, 823, 825, 826, 359/830; 396/72–75, 79, 85, 448, 449, 396/451, 462, 497, 526, 529, 542
See application file for complete search history.

(56) References Cited

U.S. PATENT DOCUMENTS

| | | | | |
|---|---|---|---|---|
| 6,963,694 B2* | 11/2005 | Nomura | ................. | G02B 7/022 396/73 |
| 7,885,525 B2* | 2/2011 | Terada | ................... | G03B 17/04 396/348 |
| 8,035,905 B2* | 10/2011 | Yamamoto | ............. | G02B 7/102 359/694 |
| 8,078,042 B2* | 12/2011 | Hagiwara | ............ | G02B 27/646 348/208.11 |
| 8,442,395 B2* | 5/2013 | Terada | ................... | G03B 17/04 396/79 |
| 8,929,004 B2* | 1/2015 | Ooya | ..................... | G02B 7/102 359/817 |

\* cited by examiner

US 10,302,899 B2

ZOOM-TYPE LENS BARREL AND IMAGE PICKUP APPARATUS

BACKGROUND OF THE INVENTION

Field of the Invention

The present invention relates to a zoom-type lens barrel mounted on an image pickup apparatus such as a digital camera, and an image pickup apparatus equipped with the zoom-type lens barrel.

Description of the Related Art

There has been proposed a zoom-type lens barrel mounted on an image pickup apparatus such as a digital camera, which rotates a cam cylinder to move a lens holder, which is engaged with a cam groove of the cam cylinder, in a direction of an optical axis (Japanese Laid-Open Patent Publication (Kokai) No. 2015-4759). According to this proposal, driving force of a motor unit, which is provided on an outer side of the cam cylinder in a radial direction, is decelerated and transmitted to the cam cylinder via a gear train, causing the cam cylinder to be rotatively driven.

There has also been proposed a zoom-type lens barrel which drives a lens holder, which is supported movably in a direction of an optical axis by a guide bar, using a drive unit such as a stepping motor, in the direction of the optical axis (Japanese Laid-Open Patent Publication (Kokai) No. 2007-271649). According to this proposal, stepping motors corresponding in number to the number of lens groups constituting a shooting optical system are provided to drive the lens groups independently of one another.

According to Japanese Laid-Open Patent Publication (Kokai) No. 2015-4759 mentioned above, however, the cam cylinder which drives the lens holder in the direction of the optical axis is rotatively driven by the motor unit provided on the outer side of the cam cylinder in the radial direction, and this brings about an increase in a size of the lens barrel in a radial direction. On the other hand, according to Japanese Laid-Open Patent Publication (Kokai) No. 2007-271649 mentioned above, there is flexibility in a shape of the lens barrel, and for example, the lens barrel should not necessarily have a cylindrical shape, but the stepping motors corresponding in number to the number of lens groups are needed, and this presents a problem because the size of the lens barrel increases, and control over the motors becomes complicated.

SUMMARY OF THE INVENTION

The present invention provides a lens barrel and an image pickup apparatus which enable miniaturization of the lens barrel without complicating control over a drive unit which moves a plurality of optical members in a direction of an optical axis.

Accordingly, the present invention provides a lens barrel comprising a first optical member configured to move in a direction of an optical axis, a second optical member configured to move in the direction of the optical axis, a cam member configured to be cam-engaged with each of the first optical member and the second optical member and be held rotatably about an axis parallel to the optical axis, and a linear actuator configured to drive the first optical member, wherein the cam member is rotated by a cam action of the cam member and the first optical member, which is driven to move in the direction of the optical axis by the linear actuator, wherein rotation of the cam member causes the second optical member to move in the direction of the optical axis due to a cam action of the second optical member and the cam member, and wherein the axis is arranged at an opposite position to the linear actuator with the optical axis as a center.

According to the present invention, it is possible to miniaturize the lens barrel without complicating control over the drive unit which moves the plurality of optical members in the direction of the optical axis.

Further features of the present invention will become apparent from the following description of exemplary embodiments (with reference to the attached drawings).

DESCRIPTION OF THE EMBODIMENTS

Hereafter, embodiments of the present invention will be described with reference to the drawings.

Figure 1:
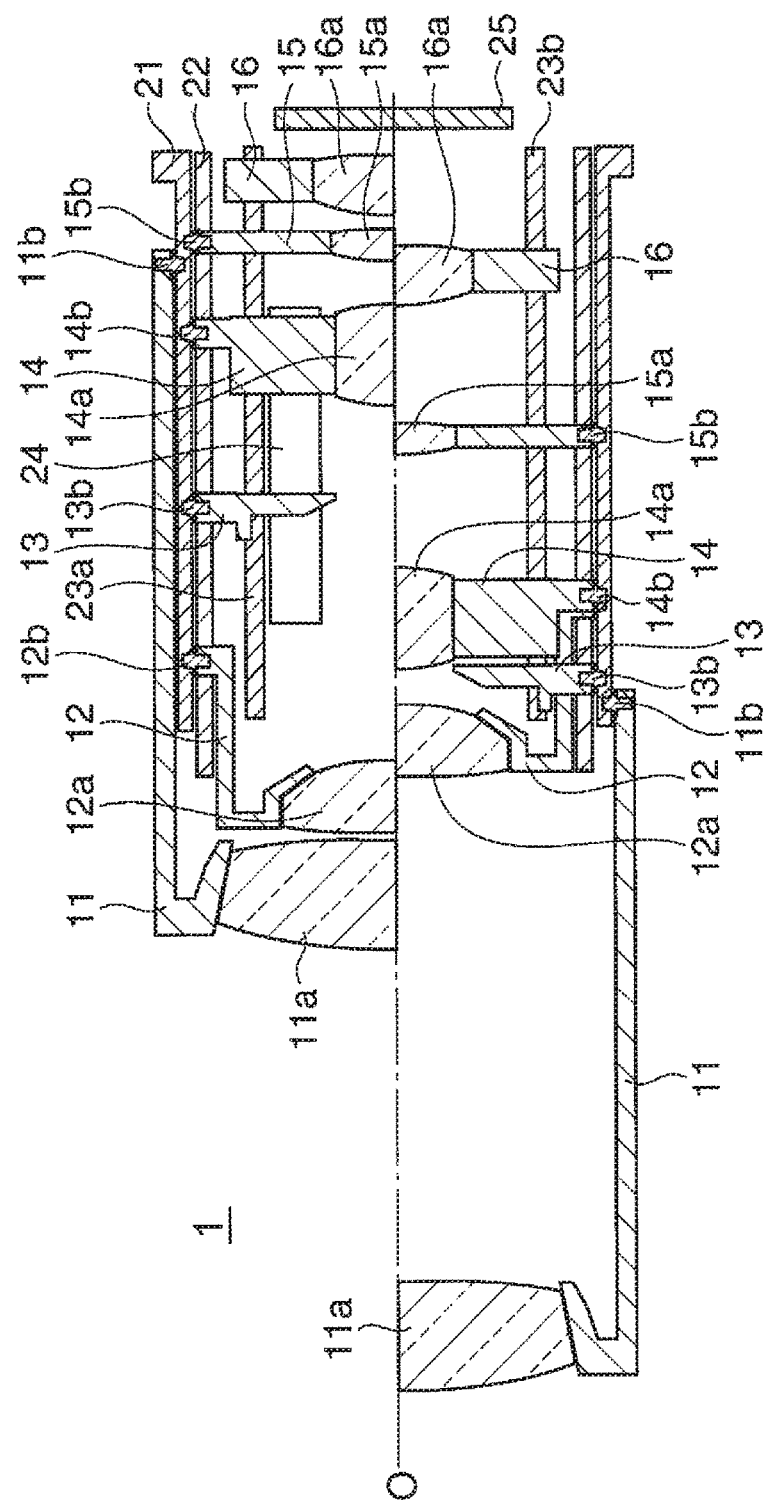
FIG. 1 is a schematic cross-sectional view showing a lens barrel according to a first embodiment of the present invention.

FIG. 1 is a schematic cross-sectional view showing a lens barrel 1 according to a first embodiment of the present invention. It should be noted that for the convenience of explanation, followers of lens holders are shown in FIG. 1, but actually, the followers of the lens holders are provided in phases staggered in a direction of rotation about an optical axis O of the lens barrel 1 and not provided on the same cross section. In FIG. 1, an upper side above the optical axis is a schematic cross-sectional view showing the lens barrel in a wide-angle position, and a lower side below the optical axis is a schematic cross-sectional view showing the lens barrel in a telephoto position. It should be noted that in the present embodiment, the lens barrel is provided on, for example, a digital camera which is an exemplary image pickup apparatus.

As shown in FIG. 1, the lens barrel according to the present embodiment has first to sixth optical units 11 to 16, a cam cylinder 21, and a fixed cylinder 22, and a zooming operation which changes shooting magnifications is performed by moving each of the first to fifth optical units 11 to 15 in the direction of the optical axis O of the lens barrel 1. The cam cylinder 21 corresponds to an exemplary cam member of the present invention.

The first optical unit 11 holds a first lens group 11a, and in an inner peripheral portion of an end of the first optical unit 11 on an image plane side, a plurality of first followers 11b is provided at substantially regular intervals in a circumferential direction. The first followers 11b are engaged with cam grooves provided in an outer peripheral portion of the cam cylinder 21, and rotation of the cam cylinder 21 causes the first followers 11b to move along the cam grooves in the direction of the optical axis.

The second optical unit 12 holds a second lens group 12a, and in an outer peripheral portion of an end of the second optical unit 12 on an image plane side, a plurality of second followers 12b is provided at substantially regular intervals in a circumferential direction. The second followers (cam pins) 12b are engaged with cam grooves provided in an inner peripheral portion of the cam cylinder 21, and rotation of the cam cylinder 21 causes the second followers 12b to move along the cam grooves in the direction of the optical axis.

The third optical unit 13 constitutes a diaphragm unit, and in an outer peripheral portion thereof, has a third follower 13b. The third optical unit 13 is supported by fitting in guide bars 23a and 23b in a state of being inhibited from rotating such that the third optical unit 13 is movable in the direction of the optical axis. The third follower 13b is engaged with a cam groove provided in an inner peripheral portion of the cam cylinder 21, and rotation of the cam cylinder 21 causes the third follower 13b to move along the cam grooves in the direction of the optical axis.

The fourth optical unit 14 holds a third lens group 14a and is driven in the direction of the optical axis by a linear actuator 24. In an outer peripheral portion of the fourth optical unit 14, a plurality of fourth followers 14b is provided at substantially regular intervals in a circumferential direction. The fourth followers 14b are engaged with cam grooves provided in the inner peripheral portion of the cam cylinder 21. It should be noted that detailed description of the fourth optical unit 14 will be given later.

The fifth optical unit 15 holds a fourth lens group 15a and is supported by fitting in the guide bars 23a and 23b in a state of being inhibited from rotating such that the fifth optical unit 15 is movable in the direction of the optical axis. One fifth follower 15b is provided in an outer peripheral portion of the fifth optical unit 15. The fifth follower 15b is engaged with a cam groove provided in an inner peripheral portion of the cam cylinder 21.

The sixth optical unit 16 holds a fifth lens group 16a, which constitutes a focus lens, and is moved in the direction of the optical axis by an actuator, not shown, to perform a focusing operation. An image pickup device 25 such as a CCD sensor or a CMOS sensor is provided on a rear side of the sixth optical unit 16. The image pickup device 25 performs photoelectrical conversion of a subject image formed by light, which has passed through the first lens group 11a, the second lens group 12a, the third lens group 14a, the fourth lens group 15a, and the fifth lens group 16a, into an electric signal and outputs the electric signal to an image processing unit, not shown.

The linear actuator 24 is a ultrasonic motor which generates driving force by generating ultrasonic vibrations in a vibrator and is a motor for use in linear driving. The ultrasonic motor has high power although it is small, and also, the ultrasonic motor makes almost no operating noise and is best suited to driving the lens barrel. A detailed description of the structure of the linear actuator 24 is omitted here, but the vibrator is held in pressure contact with a contact portion of the fourth optical unit 14, and when ultrasonic vibrations are excited in the vibrator, the fourth optical unit 14 moves in response to driving force. It should be noted that the linear actuator 24 corresponds to an exemplary drive unit of the present invention.

A description will now be given of a zooming operation of the lens barrel. To move the lens barrel from the wide-angle position in the upper side of FIG. 1 to the telephoto position in the lower side of FIG. 1, the linear actuator 24 placed in an inner peripheral side of the cam cylinder 21 is driven to move the fourth optical unit 14 toward a subject (the left-hand side in FIG. 1) in the direction of the optical axis. Since the fourth followers 14b of the fourth optical unit 14 are engaged with the cam grooves provided in the inner peripheral portion of the cam cylinder 21, a cam action of the cam grooves and the fourth followers 14b moves the fourth optical unit 14 in the direction of the optical axis, causing the cam cylinder 21 to rotate.

When the cam cylinder 21 rotates, the first to third optical units 11 to 13 and the fifth optical unit 15 with the followers 11b to 13b and 15b thereof engaged with the corresponding grooves of the cam cylinder 21 move toward the subject through a cam action of those followers and the corresponding cam grooves. Thus, by moving the fourth optical unit 14 in the direction of the optical axis by driving the linear actuator 24, the other optical units i.e. the first to third optical units 11 to 13 and the fifth optical unit 15 move in the direction of the optical axis to perform a zooming operation.

Figure 2:
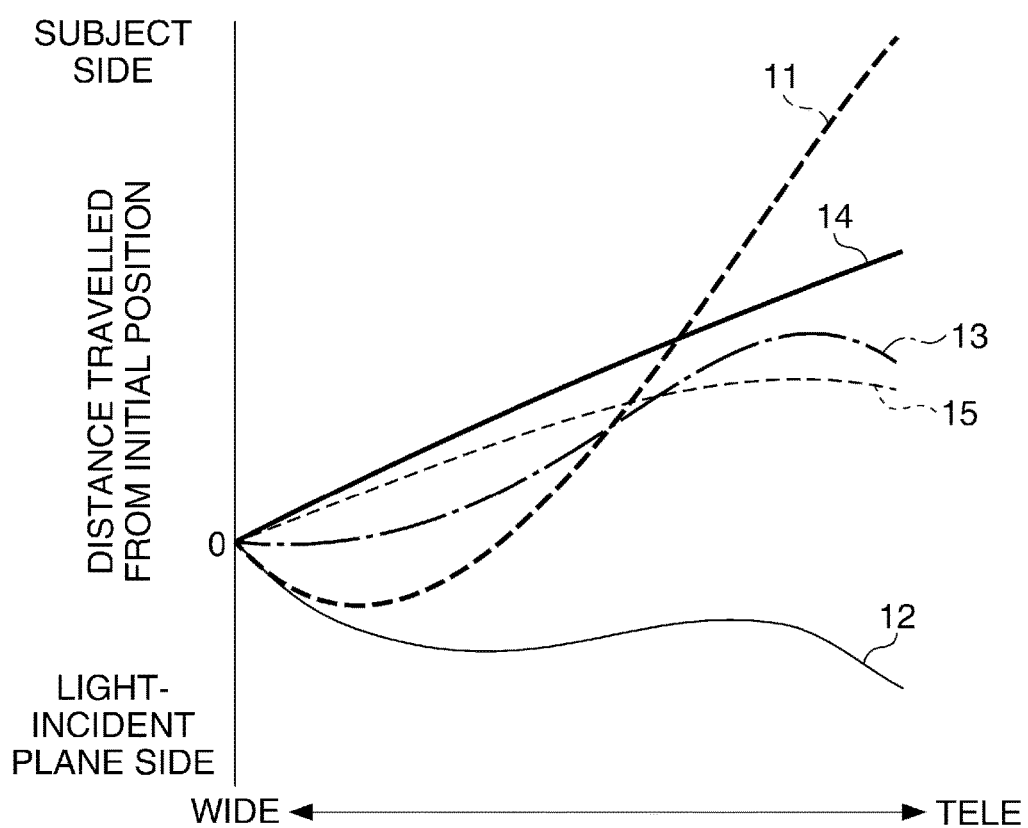
FIG. 2 is graph showing a relationship between distances traveled by first to fifth optical units from an initial position and their positions in a direction of an optical axis.

Referring next to FIG. 2, a description will be given of the reason why the fourth optical unit 14 is moved in the direction of the optical axis by the linear actuator 24 when the lens barrel performs a zooming operation. FIG. 2 is graph showing a relationship between distances traveled by the first to fifth optical units 11 to 15 from an initial position and their positions in the direction of the optical axis. In FIG. 2, the left side on the horizontal axis is the wide-angle position, and toward the right side, the first through fifth optical units 11 to 15 become closer to the telephoto position. The distance of travel indicated by the vertical axis is 0 at the wide-angle position (initial position).

As shown in FIG. 2, the fourth optical unit 14 moves substantially linearly in one direction from the wide-angle position toward the telephoto position. By driving the fourth optical unit 14, which moves substantially linearly between the wide-angle position and the telephoto position, by the linear actuator 24, the cam cylinder 21 that is cam-engaged with the fourth optical unit 14 is rotatively driven in a stable manner.

For example, the first optical unit 11 retracts once toward an image plane side and then moves toward a subject again. When the first optical unit 11 taking a movement path a direction of which varies is thus driven by the linear actuator 24, a position at which a cam inclination of the cam grooves in the cam cylinder 21, which are cam-engaged with the first optical unit 11, with respect to the optical axis is gentle appears. When the cam inclination is gentle, high load is required to convert force in the direction of the optical axis into torque, and hence torque required to stably rotate the cam cylinder 21 cannot be obtained. For this reason, in order to stably rotate the cam cylinder 21, it is preferred that the fourth optical unit 14 taking a substantially linear movement path in one moving direction is moved in the direction of the optical axis by the linear actuator 24.

As described above, in the present embodiment, a zooming operation is performed by driving the fourth optical unit 14 to move in the direction of the optical axis using the linear actuator 24, which is relatively small and disposed on the inner peripheral side of the cam cylinder 21. It is thus unnecessary to place an actuator, a decelerating gear train, and so forth outside the cam cylinder 21 in a radial direction and also unnecessary to have the same number of motors as the number of lens groups. This enables miniaturization of the lens barrel without complicating control over the motor which drives the plurality of lens groups in the direction of the optical axis. Further, the cam cylinder 21 for driving the optical units rotates about the optical axis. Consequently, a retracting space for the cam cylinder 21 associated with its movement is dispensed with, which enables miniaturization of the lens barrel. In addition, an angle of rotation of the cam cylinder 21 can be arbitrary set, which enhance degree of freedom of configuring the lens barrel.

Figure 3:
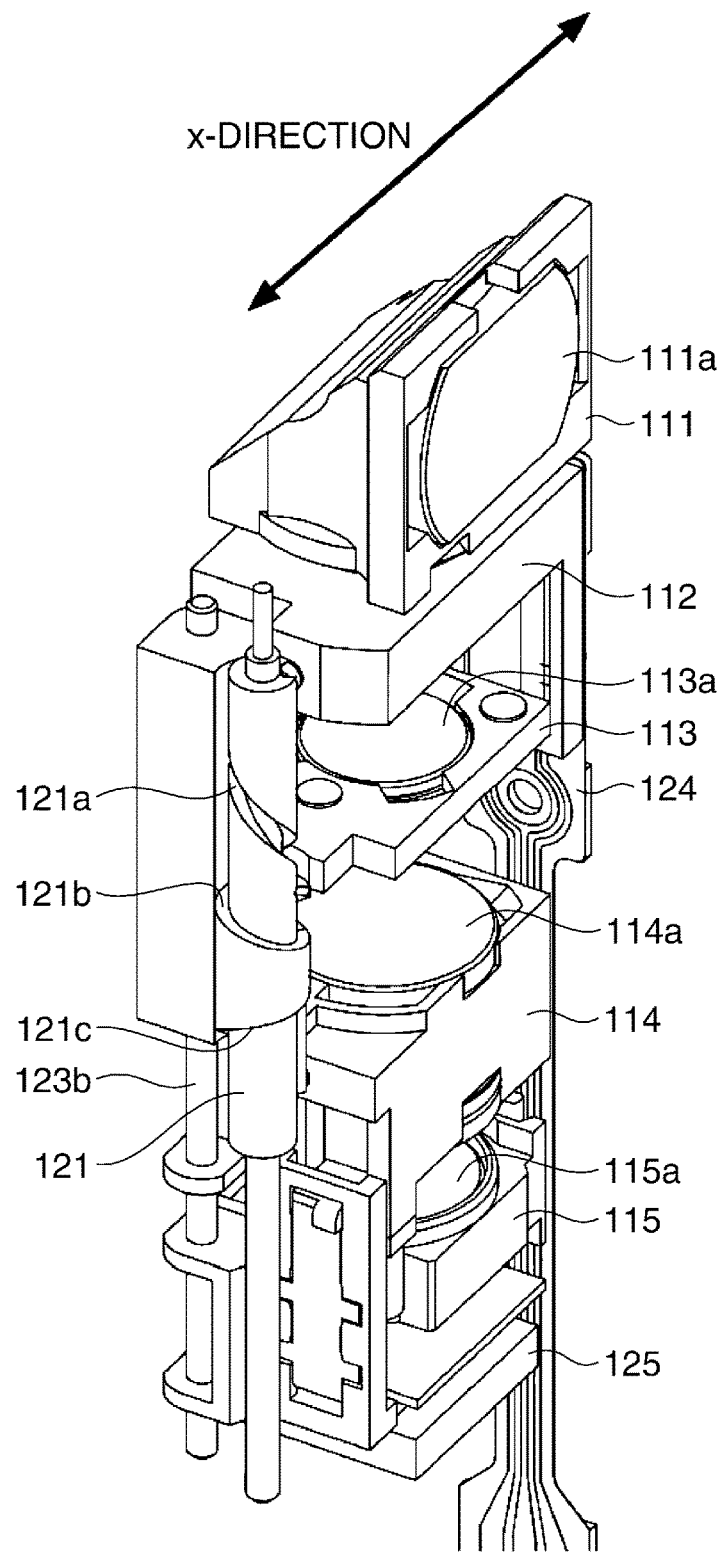
FIG. 3 is a perspective view showing essential parts of a lens barrel according to a second embodiment of the present invention.
Figure 4:
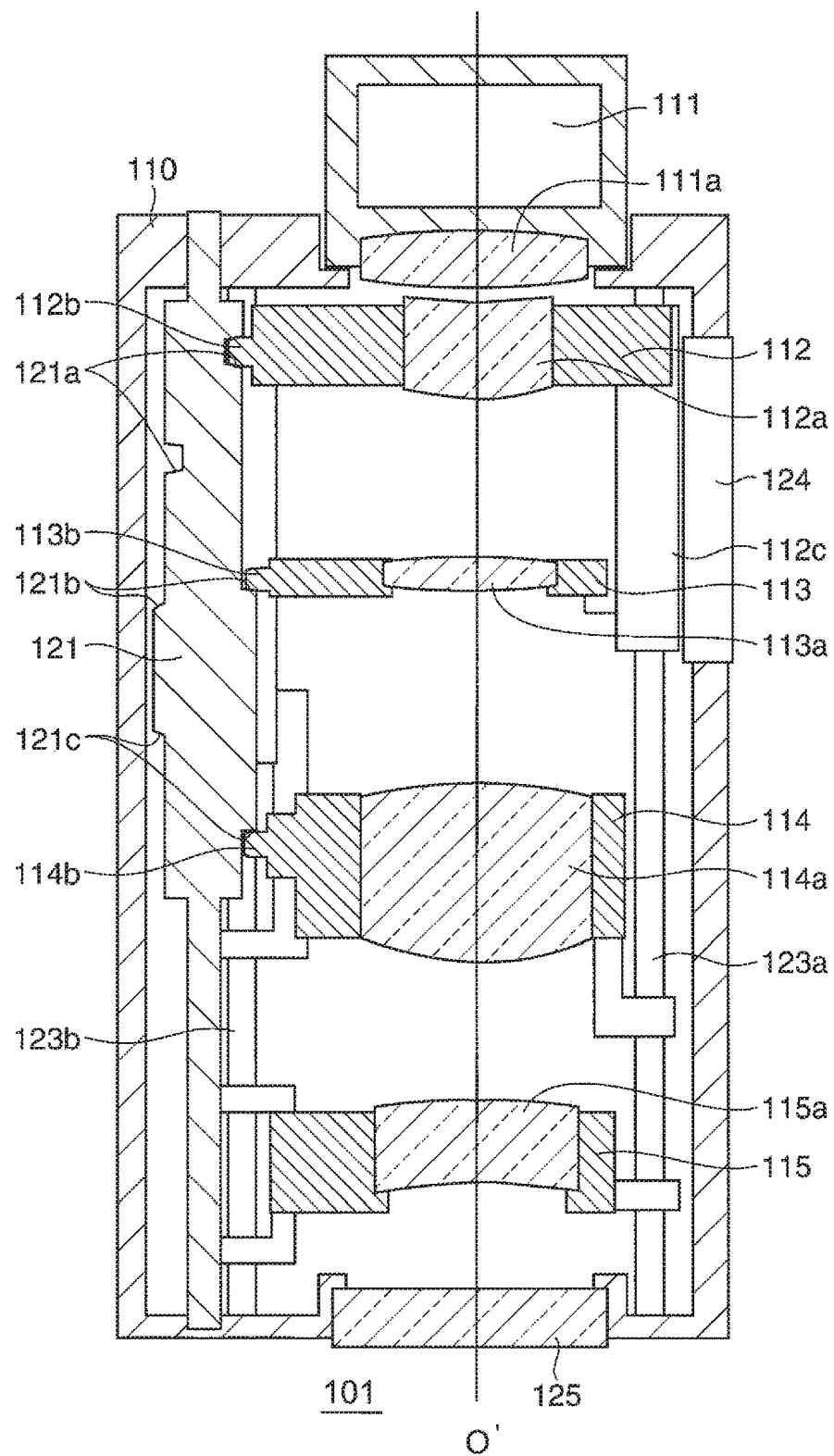
FIG. 4 is a schematic cross-sectional view taken along the optical axis and showing the lens barrel at a position of a camshaft when the lens barrel in FIG. 3 lies in a wide-angle position.
Figure 5:
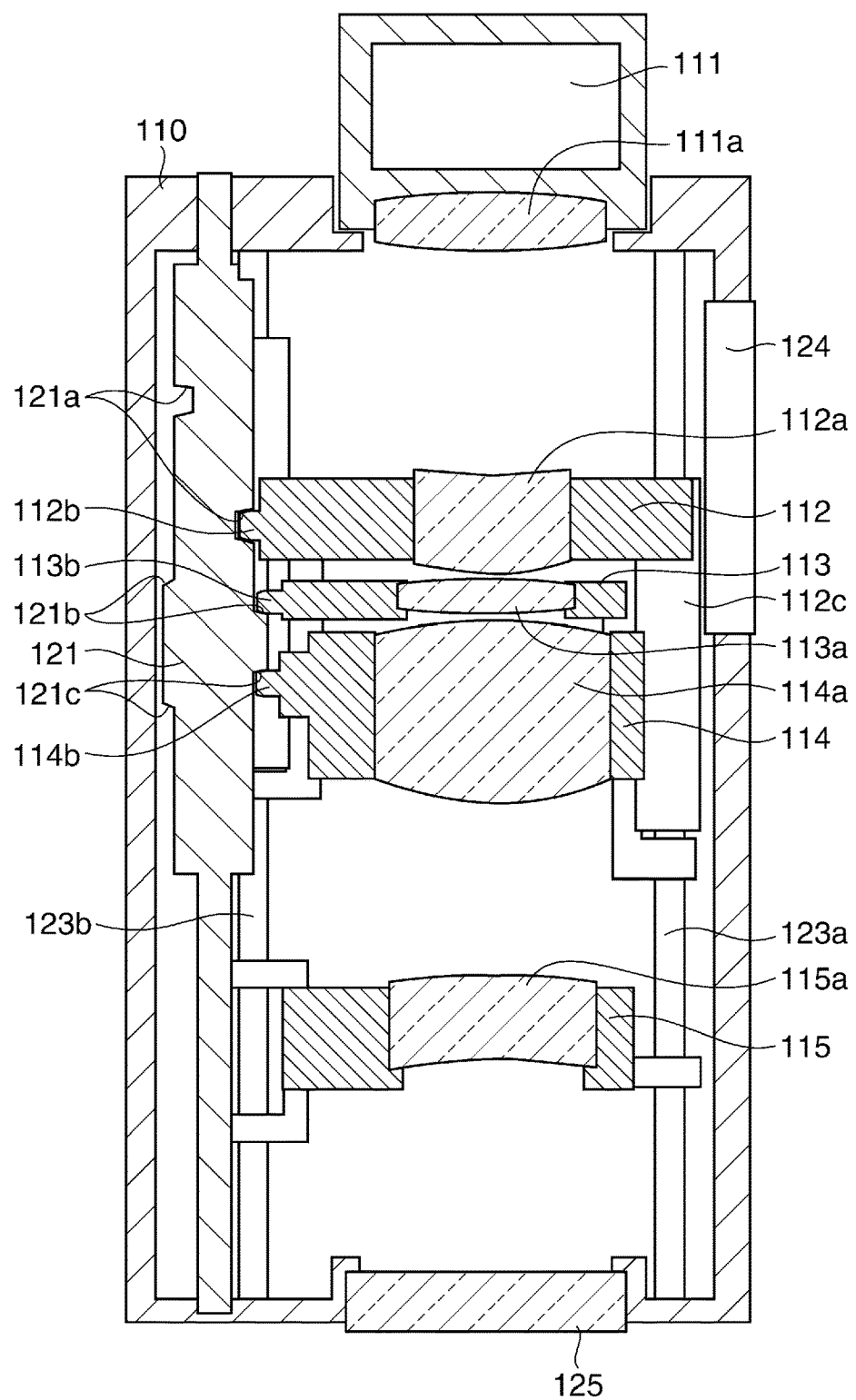
FIG. 5 is a schematic cross-sectional view taken along the optical axis and showing the lens barrel at the position of the camshaft when the lens barrel in FIG. 3 lies in a telephoto position.

Referring next to FIGS. 3 to 6, a description will be given of a lens barrel 101 according to a second embodiment of the present invention. FIG. 3 is a perspective view showing essential parts of the lens barrel. FIG. 4 is a schematic cross-sectional view taken along an optical axis O' of the lens barrel 101 and showing the lens barrel at a position of a camshaft 121 when the lens barrel in FIG. 3 lies in a wide-angle position. FIG. 5 is a schematic cross-sectional view taken along the optical axis O' and showing the lens barrel at the position of the camshaft 121 when the lens barrel in FIG. 3 lies in a telephoto position.

The lens barrel according to the present embodiment has a housing case 110, a first optical unit 111 fixed to the housing case 110, second to fifth optical units 112 to 115 movable in the direction of the optical axis, the camshaft 121, and guide bars 123a and 123b as shown in FIGS. 3 to 5. The camshaft 121 and the guide bars 123a and 123b are disposed parallel to an optical axis. The camshaft 121 is rotatably supported by the housing case 110, and the guide bars 123a and 123b are fixed to the housing case 110. The second optical unit 112 corresponds to an exemplary first optical member of the present invention.

The first optical unit 111 holds a first lens group 111a and is fixed to the housing case 110. The first lens group 111a has two lenses provided perpendicularly to each other, and a prism is interposed between the two lenses. It should be noted that although in the present embodiment, it is assumed that the first optical unit 111 is a fixed optical group, the first lens group 111a may be a movable optical group. Also, the first lens group 111a should not necessarily include the prism but may dispense with the prism and may be provided in a lens group of another optical unit on a light-incident plane side.

The second optical unit 112, which holds a second lens group 112a, is held by fitting into the guide bar 123a and also held by engaging with the guide bar 123b so as to be movable in the direction of the optical axis O'. A first follower 112b, which is to be engaged with a first cam portion 121a provided in the camshaft 121, and a contact portion 112c, which comes into contact with a linear actuator 124, are provided in an outer peripheral portion of the second optical unit 112. The second optical unit 112 is subjected to thrust in the direction of the optical axis from the linear actuator 124 by the contact portion 112c coming into contact with the linear actuator 124.

The third optical unit 113, which holds a third lens group 113a, is held by fitting into the guide bar 123b and also held by engaging with the guide bar 123a so as to be movable in the direction of the optical axis. A second follower 113b which is to be engaged with a second cam portion 121b provided in the camshaft 121 is provided in an outer peripheral portion of the third optical unit 113.

The fourth optical unit 114, which holds a fourth lens group 114a, is held by fitting into the guide bar 123b and also held by engaging with the guide bar 123a so as to be movable in the direction of the optical axis. A third follower 114b which is to be engaged with a third cam portion 121c provided in the camshaft 121 is provided in an outer peripheral portion of the fourth optical unit 114.

The fifth optical unit 115, which holds a fifth lens group 115a constituting a focus lens, is held by fitting into the guide bar 123b and also held by engaging with the guide bar 123a so as to be movable in the direction of the optical axis.

The fifth optical unit 115 is independently driven in the direction of the optical axis O' by an actuator, not shown, to perform a focusing operation. An image pickup device 125 is provided on a rear side of the fifth optical unit 115.

The image pickup device 125 is comprised of a CCD sensor, a CMOS sensor, or the like and is fixed to the housing case 110. The image pickup device 125 performs photoelectrical conversion of a subject image formed by light, which has passed through the first lens group 111a, the second lens group 112a, the third lens group 113a, the fourth lens group 114a, and the fifth lens group 115a, into an electric signal and outputs the electric signal to an image processing unit, not shown.

The linear actuator 124 is an ultrasonic motor which generates driving force by generating ultrasonic vibrations in a vibrator and is a motor for use in linear driving. The ultrasonic motor has high power although it is small, and also, the ultrasonic motor makes almost no operating noise and is therefore best suited to driving the lens barrel. A detailed description of the structure of the linear actuator 124 is omitted here, but the vibrator is held in pressure contact with the contact portion 112c of the second optical unit 112, and when ultrasonic vibrations are excited in the vibrator, the second optical unit 112 is driven.

A description will now be given of how the lens barrel moves. As described above, the second optical unit 112 is subjected to thrust from the linear actuator 124 via the contact portion 112c and moves to a position suitable for zooming. The second optical unit 112 has the first follower 112b thereof engaged with the first cam portion 121a of the camshaft 121. For this reason, as the second optical unit 112 moves in the direction of the optical axis, a cam action of the first cam portion 121a and the first follower 112b causes the camshaft 121 to rotate.

The second follower 113b of the third optical unit 113 is engaged with the second cam portion 121b of the camshaft 121, and the third follower 114b of the fourth optical unit 114 is engaged with the third cam portion 121c of the camshaft 121. For this reason, as the camshaft 121 rotates, a cam action of the second cam portion 121b and the second follower 113b and a cam action of the third cam portion 121c and the third follower 144b cause the third optical unit 113 and the fourth optical unit 114 to move in the direction of the optical axis. The lens barrel thus performs a zooming operation.

Figure 6:
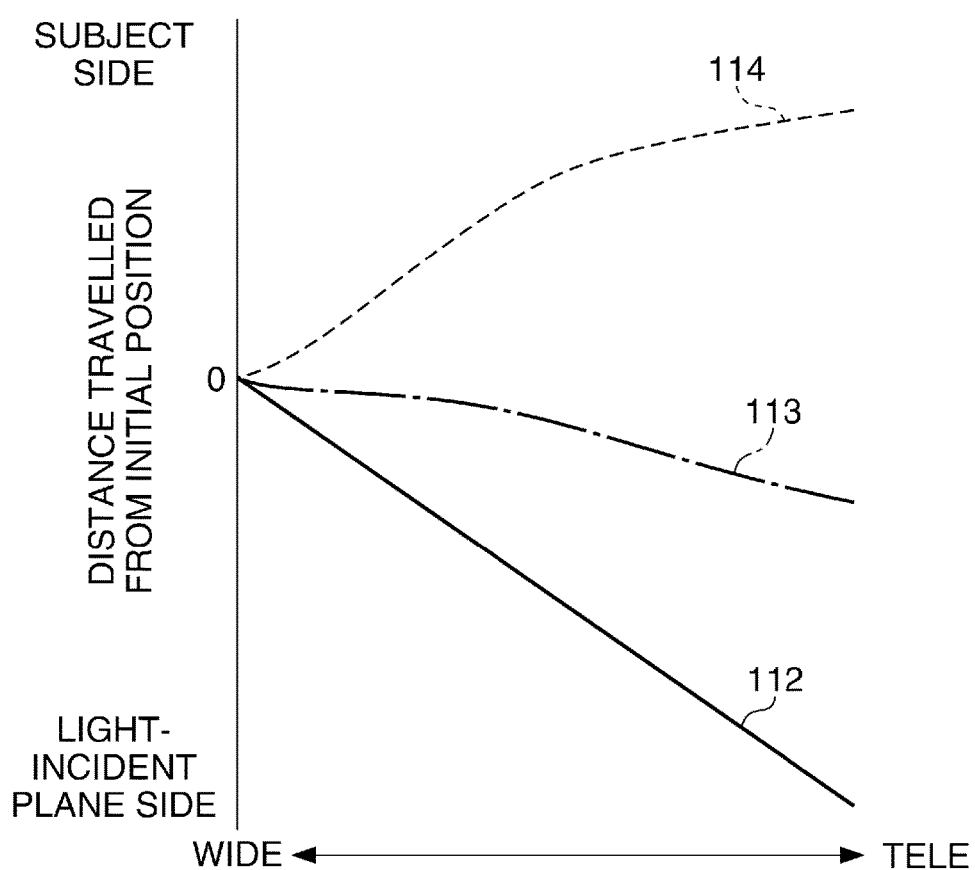
FIG. 6 is graph showing a relationship between distances traveled by the second to fourth optical units from an initial position and their positions in the direction of the optical axis.

Referring next to FIG. 6, a description will be given of the reason why the second optical unit 112 is moved by the linear actuator 124 when the lens barrel performs a zooming operation. FIG. 6 is graph showing a relationship between distances traveled by the second to fourth optical units 112 to 114 from an initial position and their positions in the direction of the optical axis. In FIG. 6, the left side on the horizontal axis is the wide-angle position, and toward the right side, the second to fourth optical units 112 to 114 become closer to the telephoto position. The distance of travel indicated by the vertical axis is 0 at the wide-angle position (initial position).

As shown in FIG. 6, among the second to fourth optical units 112 to 114, the second optical unit 112 moves substantially linearly from the wide-angle position toward the telephoto position. Thus, by driving the second optical unit 112 in one direction using the linear actuator 124, the camshaft 121 that is engaged with the second optical unit 112 is rotatively driven in a stable manner.

For example, the third optical unit 113 moves from the wide-angle position to the telephoto position while drawing a gentle curve toward the light-incident plane. If the third optical unit 113 taking such a movement path is driven by the linear actuator 124, a position at which the inclination of the second cam portion 121b of the camshaft 121, which is cam-engaged with the third optical unit 113, with respect to the optical axis is gentle would appear. When the inclination is gentle, high load is required to convert force in the direction of the optical axis into torque, and hence the camshaft 121 cannot be stably rotated. For this reason, in order to stably rotate the camshaft 121, it is preferred that the second optical unit 112 taking a substantially linear movement path in one moving direction is moved in the direction of the optical axis by the linear actuator 124.

It is also preferred that among the first to third cam portions 121a to 121c provided in the camshaft 121, the inclination of the first cam portion 121a, which is to be engaged with the second optical unit 112 driven by the linear actuator 124, with respect to the optical axis O' is the steepest. This is because the steeper the inclination of a cam portion, which is for rotating the camshaft 121, with respect to the optical axis, the smaller the thrust required to rotate the camshaft 121.

Also, the gentler the inclination of the cam portions 121b and 121c of the camshaft 121 with respect to the optical axis O', the smaller the torque of the camshaft 121 required to move the third and fourth optical units 113 and 114. Reducing the torque of the camshaft 121 means that it becomes possible to reduce the thrust of the linear actuator 124. According to the present embodiment, in order for the cam portions 121a to 121c to have such a relationship in terms of the inclination with respect to the optical axis O', the second optical unit 112, which is a lens group moving over the longest distance from the wide-angle position to the telephoto position, is driven, and the cams of the camshaft 121 are created at varying diameters.

As described above, in the present embodiment, a zooming operation is performed by moving the second optical unit 112 using the linear actuator 124, which is relatively small and placed in the housing case 110, in the direction of the optical axis. It is thus unnecessary to place an actuator, a decelerating gear train, and so forth outside the cam cylinder in a radial direction and also unnecessary to have the same number of motors as the number of lens groups. This enables miniaturization of the lens barrel without complicating control over the motor which drives the plurality of lens groups in the direction of the optical axis.

Moreover, in the present embodiment, since the camshaft 121, the guide bars 123a and 123b, and the linear actuator 124 are placed in one direction (the direction indicated by an arrow X in FIG. 3) perpendicular to the optical axis, the lens barrel is slimmed down.

Furthermore, the linear actuator 124 used in the present embodiment has its vibrator held in pressure contact with the contact portion 112c of the second optical unit 112, and thus the linear actuator 124 performs a function of aligning to one-side for the guide bar 123a of the second optical unit 112. Thus, the second optical unit 112 moves smoothly without wobbling.

Moreover, in the present embodiment, the second to fourth optical units 112 to 114 are moved in the direction of the optical axis by rotating the axial camshaft 121 placed in the housing case 110. This increases flexibility in layout as compared to the case where a cam cylinder is used and makes it possible to for the lens barrel to taken on an arbitrary shape other than a cylindrical shape. Further, similar to the first embodiment, the camshaft 121 for driving the optical units rotates about an axis parallel to the optical axis. Consequently, a retracting space for the cam shaft 121 associated with its movement is dispensed with, which enables miniaturization of the lens barrel. In addition, an angle of rotation of the cam shaft 121 having an axial shape is desired to be set at large to ensure lengths for engaging with the optical units. In the configuration of the present embodiment in which the retracting space is not required, even if the angle of rotation of the cam shaft 121 is large, the angle of rotation of the cam shaft 121 does not affect a space for accommodating the cam shaft 121.

Figure 7:
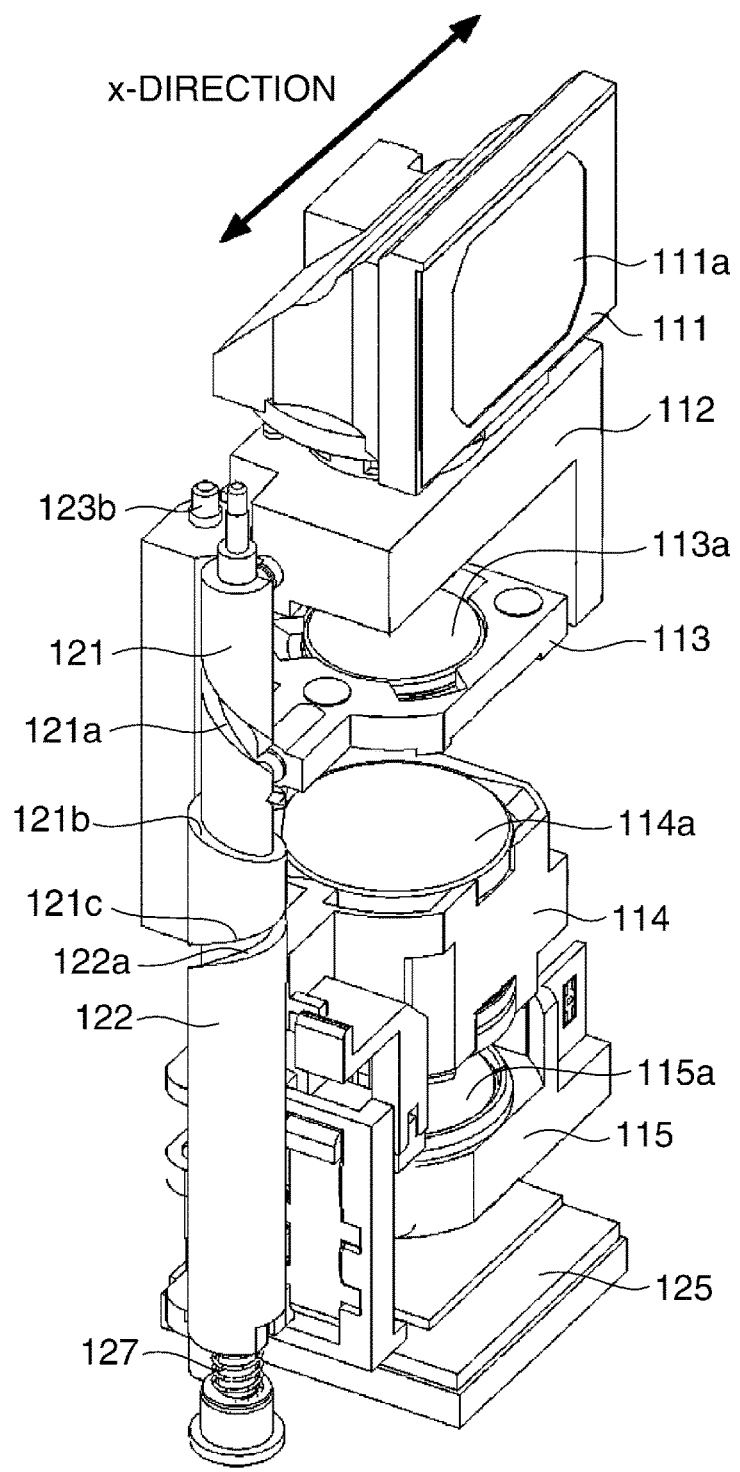
FIG. 7 is a perspective view showing essential parts of a lens barrel according to a third embodiment of the present invention.
Figure 8:
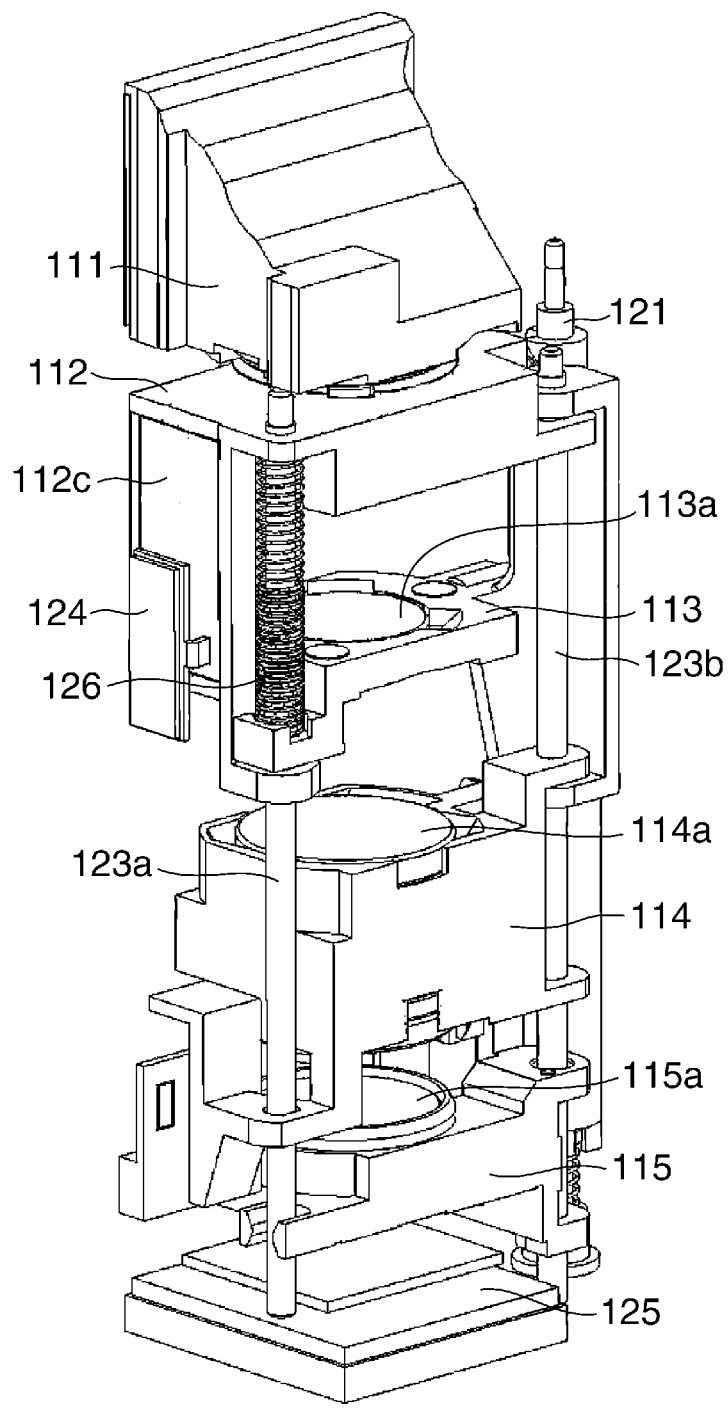
FIG. 8 is a perspective view showing the lens barrel in FIG. 7 as seen from behind.
Figure 9:
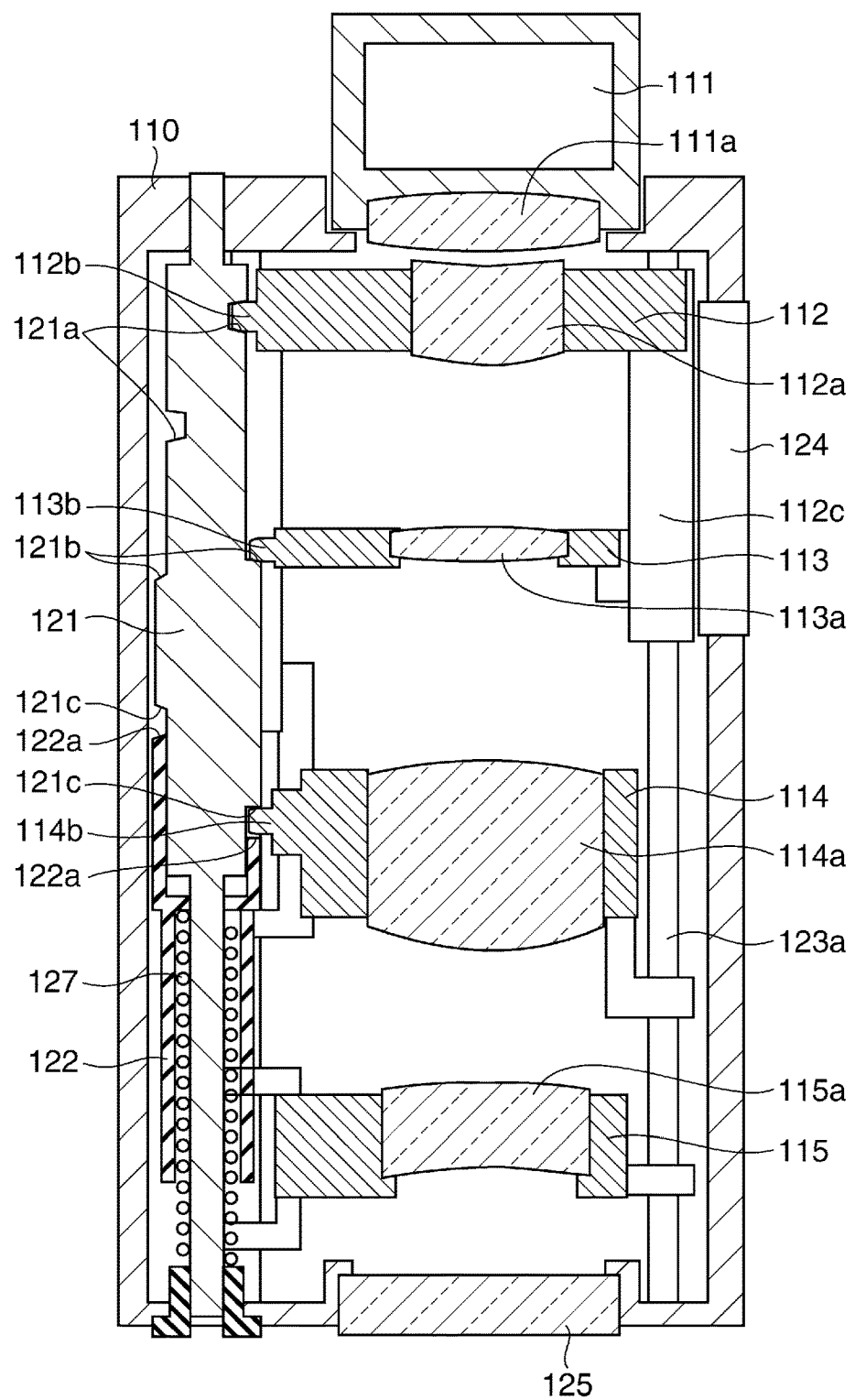
FIG. 9 is a schematic cross-sectional view taken along the optical axis and showing the lens barrel at a position of a camshaft when the lens barrel in FIG. 7 lies in a wide-angle position.
Figure 10:
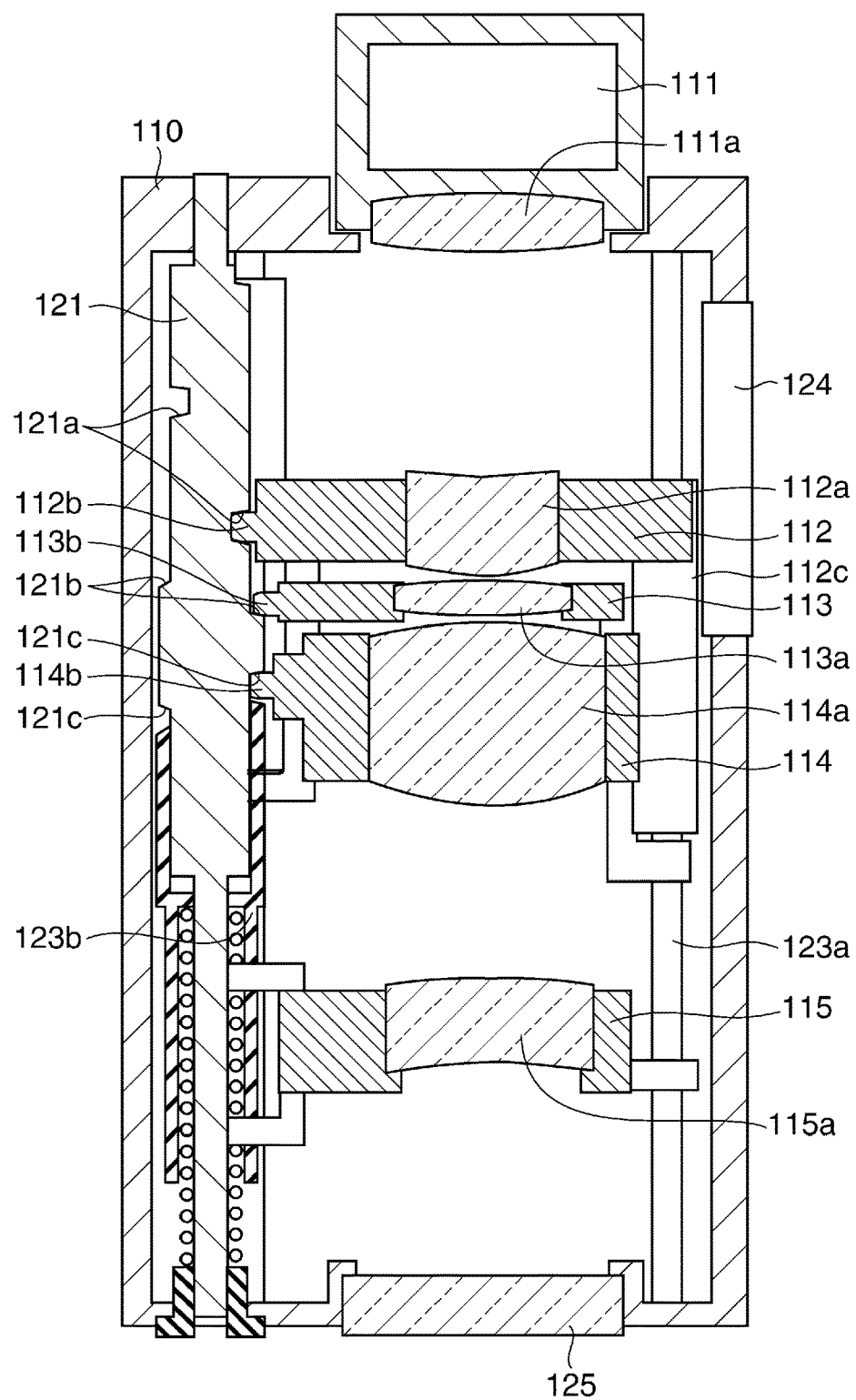
FIG. 10 is a schematic cross-sectional view taken along the optical axis and showing the lens barrel at the position of the camshaft when the lens barrel in FIG. 7 lies in a telephoto position.
Figure 11:
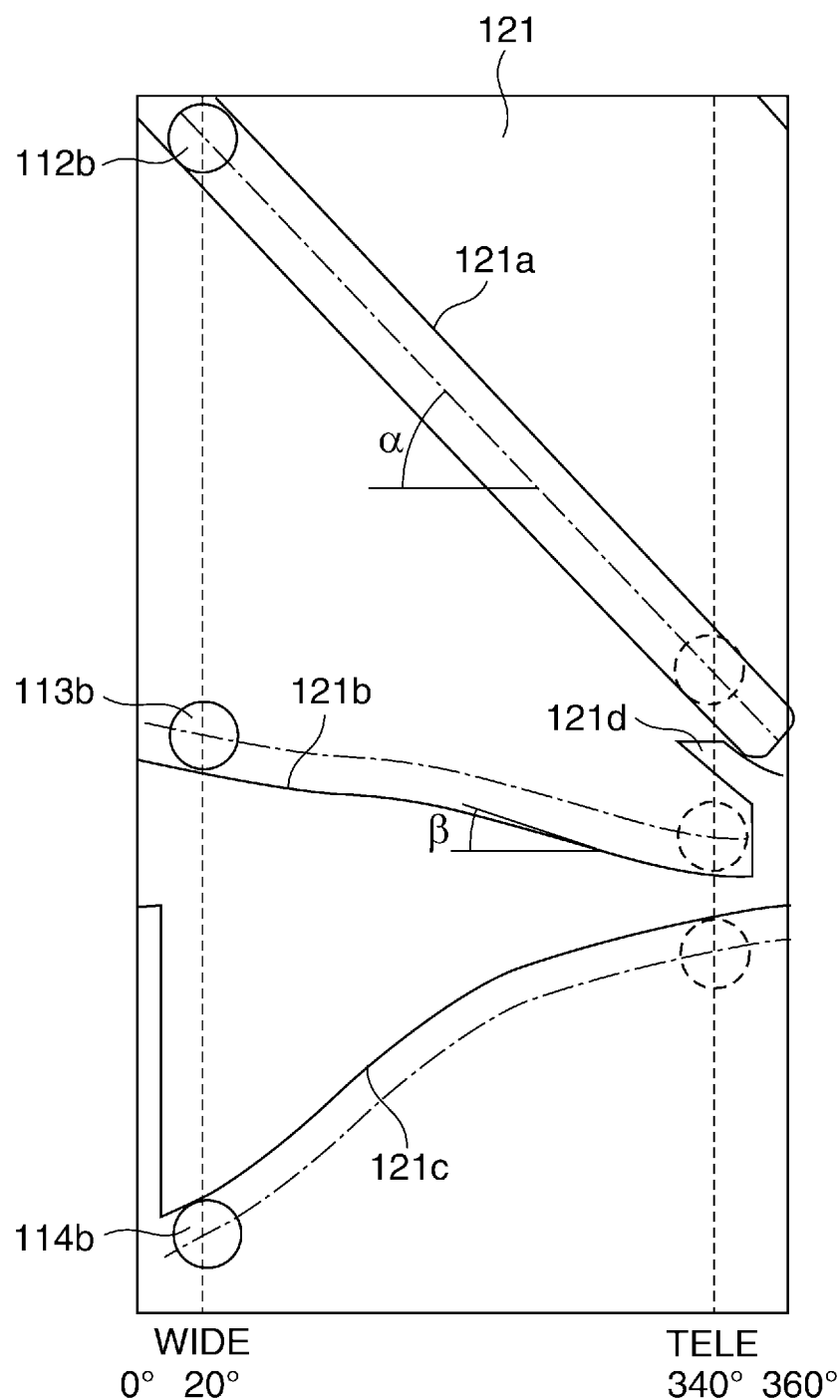
FIG. 11 is a schematic diagram showing a cam portion of a camshaft developed at a predetermined diameter.

Referring next to FIGS. 7 to 11, a description will be given of a lens barrel according to a third embodiment of the present invention. FIG. 7 is a perspective view showing essential parts of the lens barrel. FIG. 8 is a perspective view showing the lens barrel in FIG. 7 as seen from behind. FIG. 9 is a schematic cross-sectional view taken along the optical axis and showing the lens barrel at a position of a camshaft 121 when the lens barrel in FIG. 7 lies in a wide-angle position. FIG. 10 is a schematic cross-sectional view taken along the optical axis and showing the lens barrel at the position of the camshaft 121 when the lens barrel in FIG. 7 lies in a telephoto position. FIG. 11 is a schematic diagram showing a cam portion of the camshaft 121 developed at a predetermined diameter.

The lens barrel according to the present embodiment has a housing case 110, a first optical unit 111 fixed to the housing case 110, second to fifth optical units 112 to 115 movable in the direction of the optical axis, the camshaft 121, an urging cam 122, and guide bars 123a and 123b as shown in FIGS. 7 to 11. The camshaft 121, the urging cam 122, and the guide bars 123a and 123b are disposed parallel to the optical axis. The camshaft 121 is rotatably supported by the housing case 110, and the guide bars 123a and 123b are fixed to the housing case 110. The second optical unit 112 corresponds to an exemplary first optical member of the present invention, and the third optical unit 113 corresponds to an exemplary second optical member of the present invention.

The first optical unit 111 holds a first lens group 111a and is fixed to the housing case 110. The first lens group 111a has two lenses provided perpendicularly to each other, and a prism is interposed between the two lenses. It should be noted that although in the present embodiment, it is assumed that the first optical unit 111 is a fixed optical group, the first optical unit 111 may be a movable optical group. The first lens group 111a should not necessarily include the prism but the prism may be provided in a lens group of another optical unit on an image plane side.

The second optical unit 112, which holds a second lens group 112a, is held by fitting into the guide bar 123a and also held by engaging with the guide bar 123b so as to be movable in a direction of the optical axis. A first follower 112b, which is to be engaged with a first cam portion 121a provided in the camshaft 121, and a contact portion 112c, which comes into contact with a linear actuator 124, are provided in an outer peripheral portion of the second optical unit 112. The second optical unit 112 is subjected to thrust in the direction of the optical axis from the linear actuator 124 by the contact portion 112c coming into contact with the linear actuator 124. The first cam portion 121a corresponds to an exemplary first engaging member of the present invention, and the second cam portion 121b corresponds to an exemplary second engaging member of the present invention.

The third optical unit 113, which holds a third lens group 113a, is held by fitting into the guide bar 123b and also held by engaging with the guide bar 123a so as to be movable in the direction of the optical axis. A second follower 113b which is to be engaged with a second cam portion 121b provided in the camshaft 121 is provided in an outer peripheral portion of the third optical unit 113.

The third optical unit 113 is urged in such a direction that the second optical unit 112 and the third optical unit 113 are separated from each other by a first spring 126 (FIG. 8). More specifically, the third optical unit 113 is urged downward as viewed in FIGS. 7 and 8. This enables the third optical unit 113 to be kept in contact with the second cam portion 121b of the camshaft 121, and as the camshaft 121 rotates, the third optical unit 113 is able to move in the direction of the optical axis by following a surface of the second cam portion 121b.

The fourth optical unit 114, which holds a fourth lens group 114a, is held by fitting into the guide bar 123b and also held by engaging with the guide bar 123a so as to be movable in the direction of the optical axis. A third follower 114b which is to be engaged with a third cam portion 121c provided in the camshaft 121 is provided in an outer peripheral portion of the fourth optical unit 114.

The fourth optical unit 114 is held such that the third follower 114b is sandwiched between the third cam portion 121c and the urging cam 122 (FIG. 8), to be described later. This enables the third follower 114b to be kept in contact with the third cam portion 121c, and as the camshaft 121 rotates, the third follower 114b is able to move in the direction of the optical axis by following a surface of the third cam portion 121c.

The fifth optical unit 115, which holds a fifth lens group 115a constituting a focus lens, is held by fitting into the guide bar 123b and also held by engaging with the guide bar 123a so as to be movable in the direction of the optical axis. The fifth optical unit 115 is independently driven in the direction of the optical axis by an actuator to perform a focusing operation. An image pickup device 125 is provided on a rear side of the fifth optical unit 115.

The camshaft 121 has a stepped axial shape, and the first cam portion 121a, the second cam portion 121b, and the third cam portion 121c are provided in an outer peripheral portion of the camshaft 121. The first cam portion 121a is shaped like a groove, and the first follower 112b provided in the second optical unit 112 is engaged with the first cam portion 121a in a state of being supported by two surfaces such that the first follower 112b is fitted in the groove. Further, the second cam portion 121b is provided in a convex portion at a different diameter from a diameter at which the first cam portion 121a is provided, and a cam surface is formed on a side face on the side on which the first cam portion 121a is provided. As described earlier, the third optical unit 113 is urged downward as viewed in FIGS. 7 and 8 to move by following the second cam portion 121b. Further, the third cam portion 121c is at substantially the same diameter as the diameter at which the second cam portion 121b is provided, and is formed by a surface on an opposite side of the second cam portion 121b.

The urging cam 122 is placed coaxially with the camshaft 121 and has on an inner side thereof the second spring 127. The camshaft 121 and the urging cam 122 are movable integrally with each other in a direction of a rotational axis because of key fitting. The cam shaft 121 and the urging cam 122 are urged by the second spring 127 in such directions as to become closer to each other. A third B cam 122a which takes the same path as that taken by the third cam portion 121c of the camshaft 121 is provided at an upper end of the urging cam 122. The third follower 114b of the fourth optical unit 114 is engaged with the third B cam 122a and the third cam portion 121c in a state of being sandwiched therebetween. Being urged by the second spring 127, the third follower 114b is kept pressed against the third cam portion 121c and held without rattling.

The image pickup device 125 is comprised of a CCD sensor, a CMOS sensor, or the like and is fixed to the housing case 110. The image pickup device 125 performs photoelectrical conversion of a subject image formed by light, which has passed through the first lens group 111a, the second lens group 112a, the third lens group 113a, the fourth lens group 114a, and the fifth lens group 115a, into an electric signal and outputs the electric signal to an image processing unit, not shown.

Figure 12:
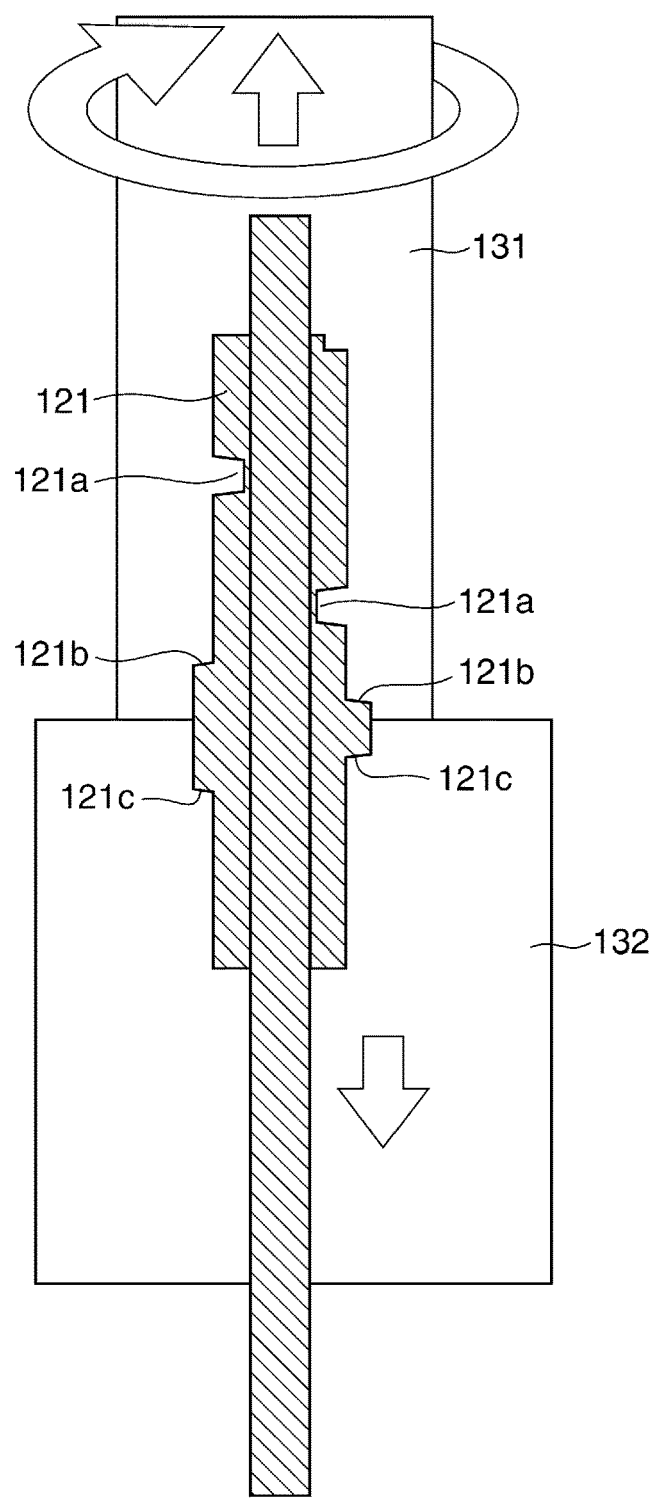
FIG. 12 is a schematic diagram useful in explaining how the camshaft is molded.
Figure 13:
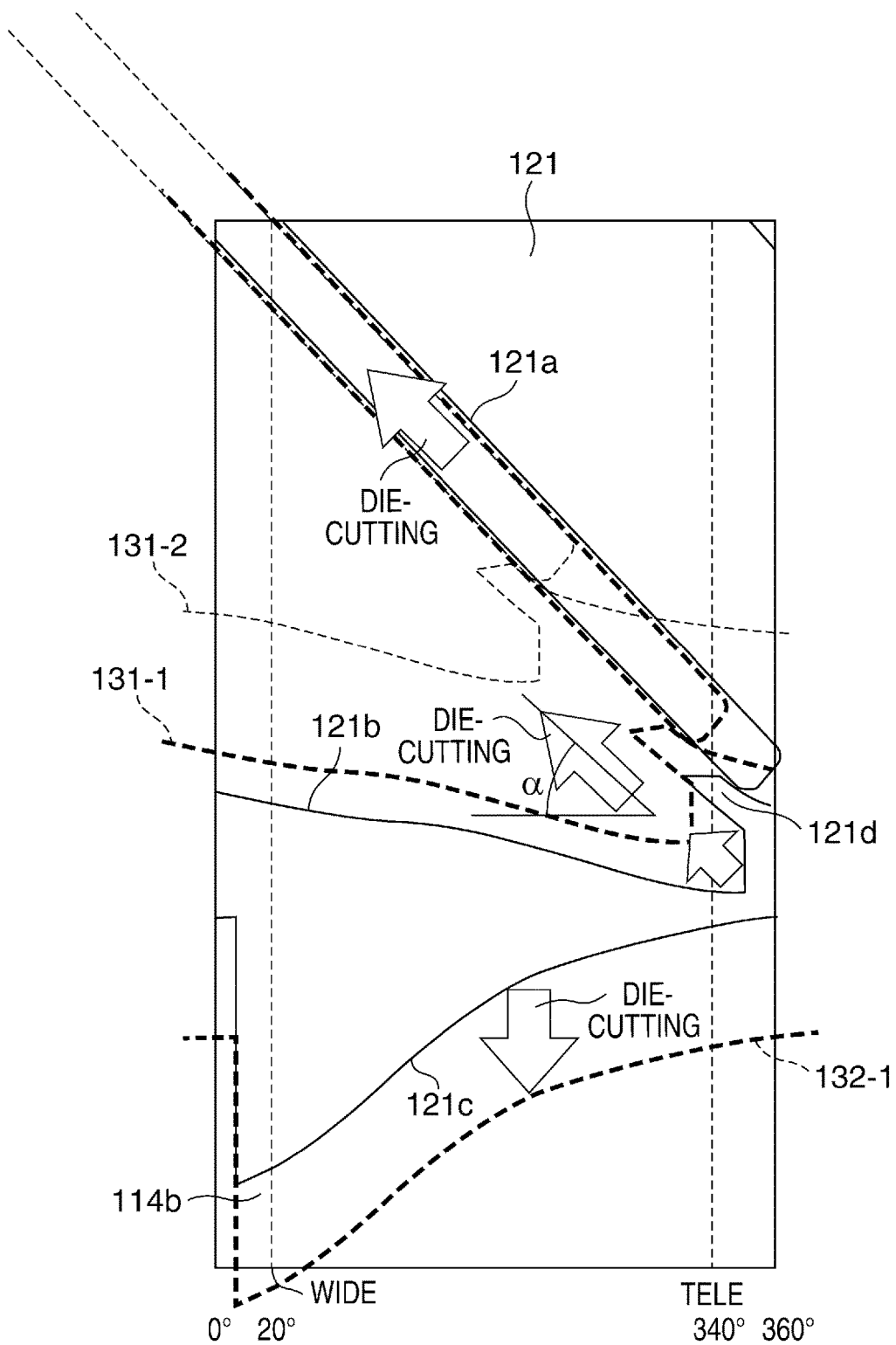
FIG. 13 is a schematic diagram useful in explaining how the camshaft is molded.

Referring next to FIGS. 11 to 13, a detailed description will be given of a shape of the camshaft 121 and how the camshaft 121 is molded. FIG. 11 is a schematic diagram showing the first to third cam portions 121a to 121c developed at a predetermined diameter. FIG. 12 is a diagram schematically showing a die-cutting method for use in forming the camshaft 121 by molding, and FIG. 13 is a diagram schematically showing a direction in which the camshaft 121 developed at a predetermined diameter to schematically show die-cutting directions.

The cam shaft 121 and the second to fourth optical units 112 to 114 move in response to movement of each other, and hence paths taken by the cam portions 121a to 121c in FIG. 11 correspond to paths taken by lenses at zoom positions.

As is apparent from FIG. 11, the first cam portion 121a is linearly formed with a predetermined angle of inclination $\alpha$, and the second cam portion 121b and the third cam portion 121c are nonlinearly formed. In this case, a relationship $\alpha \geq \beta$ holds where the inclination angle of a part of the second cam portion 121b which is inclined most is $\beta$.

FIGS. 12 and 13 show how two upper and lower dies 131 and 132 are pulled out to be removed from a molded item when the cam shaft 121 configured as described above is to be molded. To form the camshaft 121 by molding, the camshaft 121 is subjected to rotational die-cutting using an integral die piece 131 which is able to mold the first cam portion 121a and the second cam portion 121b (a ridge line of the die 131 which forms the second cam portion 121b moves from 131-1 to 131-2). The third cam portion 121c is formed by sliding downward as viewed in FIG. 12 using the die 132. This molds the first cam portion 121a in the form of a groove while molding both the first cam portion 121a and the second cam portion 121b without leaving any parting lines on them.

On the other hand, when α<β holds, rotational die-cutting is performed at an inclination of α, and a die cannot be pulled out in a manner avoiding a surface of the second cam portion 121b, resulting in undercutting. In actual molding, as shown in FIG. 12, the die 131 is configured to be pulled out upward while being rotated. The second cam portion 121b shaped like a groove is required to be a linear groove at an inclination angle of a so as not be undercut, but in the present embodiment, the second cam portion 121b and the third cam portion 121c assume planar shapes. Thus, their cam paths are nonlinear, and they are allowed to be molded without being undercut.

Assuming that the first to third cam portions 121a to 121c provided in the camshaft 121 are formed within a range of approximately 120 degrees, they are allowed to be molded using the integral die piece 131 if they are die-cut from a circumferential direction without forming a die level difference in the cams. In the present embodiment, however, even when the rotational angle of the camshaft 121 is as large as 120 degrees or more, they are allowed to be molded using an integral die piece. This arrangement is effective because when the camshaft 121, which is relatively small in its diameter, is designed to secure sufficient cam lengths so that optical units can move with accuracy, the rotational angle of the camshaft 121 would be large. A die level difference appearing in cams would cause wobbling of optical units which move by following the cams, and this is not preferred because performance deteriorates, and visibility of an image decreases.

Further, a fall-off preventive wall 121d, which is an exemplary fall-off preventive unit of the present invention, is provided at a position in a direction opposite to a telephoto direction ahead of a position at which the second follower 113b is engaged with the second cam portion 121b in the wide-angle position. This prevents the second follower 113b from falling off because of the camshaft 121 rotating unexpectedly due to a shock or the like applied in the wide-angle position.

The third cam portion 121c is molded by drawing the die 132 downward as described earlier. For this reason, in the present embodiment, the first to third cam portions 121a to 121c are formed within a range no greater than approximately 360 degrees. Specifically, the camshaft 121 is configured to rotate 320 degrees between the wide-angle position and the telephoto position.

A description will now be given of how the lens barrel moves. As described above, the second optical unit 112 is subjected to thrust from the linear actuator 124 via the contact portion 112c and moves to a position suitable for zooming. The second optical unit 112 has the first follower 112b thereof engaged with the first cam portion 121a of the camshaft 121. For this reason, as the second optical unit 112 moves in the direction of the optical axis, a cam action of the first cam portion 121a and the first follower 112b causes the camshaft 121 to rotate.

The second follower 113b of the third optical unit 113 is engaged with the second cam portion 121b of the camshaft 121, and the third follower 114b of the fourth optical unit 114 is engaged with the third cam portion 121c of the camshaft 121. For this reason, as the camshaft 121 rotates, a cam action of the second cam portion 121b and the second follower 113b and a cam action of the third cam portion 121c and the third follower 114b cause the third optical unit 113 and the fourth optical unit 114 to move in the direction of the optical axis. The lens barrel thus performs a zooming operation.

Next, referring again to FIG. 6 used in the above description of the second embodiment, a description will be given of the reason why the second optical unit 112 is moved in the direction of the optical axis by the linear actuator 124 when the lens barrel performs a zooming operation. As described earlier, FIG. 6 is graph showing the relationship between distances traveled by the second to fourth optical units 112 to 114 from an initial position and their positions in the direction of the optical axis. In FIG. 6, the left side on the horizontal axis is the wide-angle position, and toward the right side, the second to fourth optical units 112 to 114 become closer to the telephoto position. The distance of travel indicated by the vertical axis is 0 at the wide-angle position (initial position).

As shown in FIG. 6, among the second to fourth optical units 112 to 114, the second optical unit 112 moves substantially linearly from the wide-angle position toward the telephoto position. Thus, by driving the second optical unit 112 in one direction using the linear actuator 124, the camshaft 121 that is engaged with the second optical unit 112 is rotatively driven in a stable manner.

For example, the third optical unit 113 moves from the wide-angle position to the telephoto position while drawing a gentle curve toward a light-incident plane. If the third optical unit 113 taking such a movement path is driven by the linear actuator 124, a position at which the inclination of the second cam portion 121b of the camshaft 121, which is cam-engaged with the third optical unit 113, with respect to the optical axis is gentle would appear. When the inclination is gentle, high load is required to convert force in the direction of the optical axis into torque, and hence the camshaft 121 cannot be stably rotated. For this reason, in order to stably rotate the camshaft 121, it is preferred that the second optical unit 112 taking a substantially linear movement path in one moving direction is moved in the direction of the optical axis by the linear actuator 124.

It is also preferred that among the first to third cam portions 121a to 121c provided in the camshaft 121, the inclination of the first cam portion 121a, which is to be engaged with the second optical unit 112 driven by the linear actuator 124, with respect to the optical axis is the steepest. This is because the steeper the inclination of a cam portion, which is for rotating the camshaft 121, with respect to the optical axis, the smaller the thrust required to rotate the camshaft 121.

Also, the gentler the inclination of the cam portions 121b and 121c of the camshaft 121 with respect to the optical axis, the smaller the torque of the camshaft 121 required to move the third and fourth optical units 113 and 114. Making it possible to reduce the torque of the camshaft 121 means making it possible to reduce the thrust of the linear actuator 124. According to the present embodiment, in order for the cam portions 121a to 121c to have such a relationship in terms of the inclination with respect to the optical axis, and the camshaft 121 is created in diameters varying in the direction of the optical axis.

As described above, in the present embodiment, because the camshaft 121 with a small diameter is placed outside the plurality of optical units 112 to 114, the optical units 112 to 114 are able to move, and the lens barrel is slimmed down and miniaturized. Moreover, the cam portions 121a to 121c formed in the camshaft 121 have such cam shapes as to be molded using an integral die piece even when angular ranges of the cam portions 121a to 121c formed in the camshaft 121 are relatively wide. As a result, no parting lines are left on the cams.

It should be noted that in the present embodiment, in the camshaft 121, the first cam portion 121a and the second cam portion 121b are molded by rotational die-cutting using an integral die piece, whereas the third cam portion 121c is not molded by rotational die-cutting. However, the third cam portion 121c may be molded by rotational die-cutting, and further, in the camshaft 121 additionally provided with a fourth cam portion, a third cam portion and the fourth cam portion may be molded by rotational die-cutting using an integral die piece.

Moreover, although in the present embodiment, the ultrasonic linear actuator 124 is used so as to rotate the camshaft 121, a driving source for rotating the camshaft 121 is not limited to an ultrasonic type and may not have linear output. For example, a stepping motor may rotate the camshaft 121 directly or through a plurality of gears. When the stepping motor is used, the second optical unit 112, the third optical unit 113, and the fourth optical unit 114 move as the camshaft 121 rotates.

Figure 14:
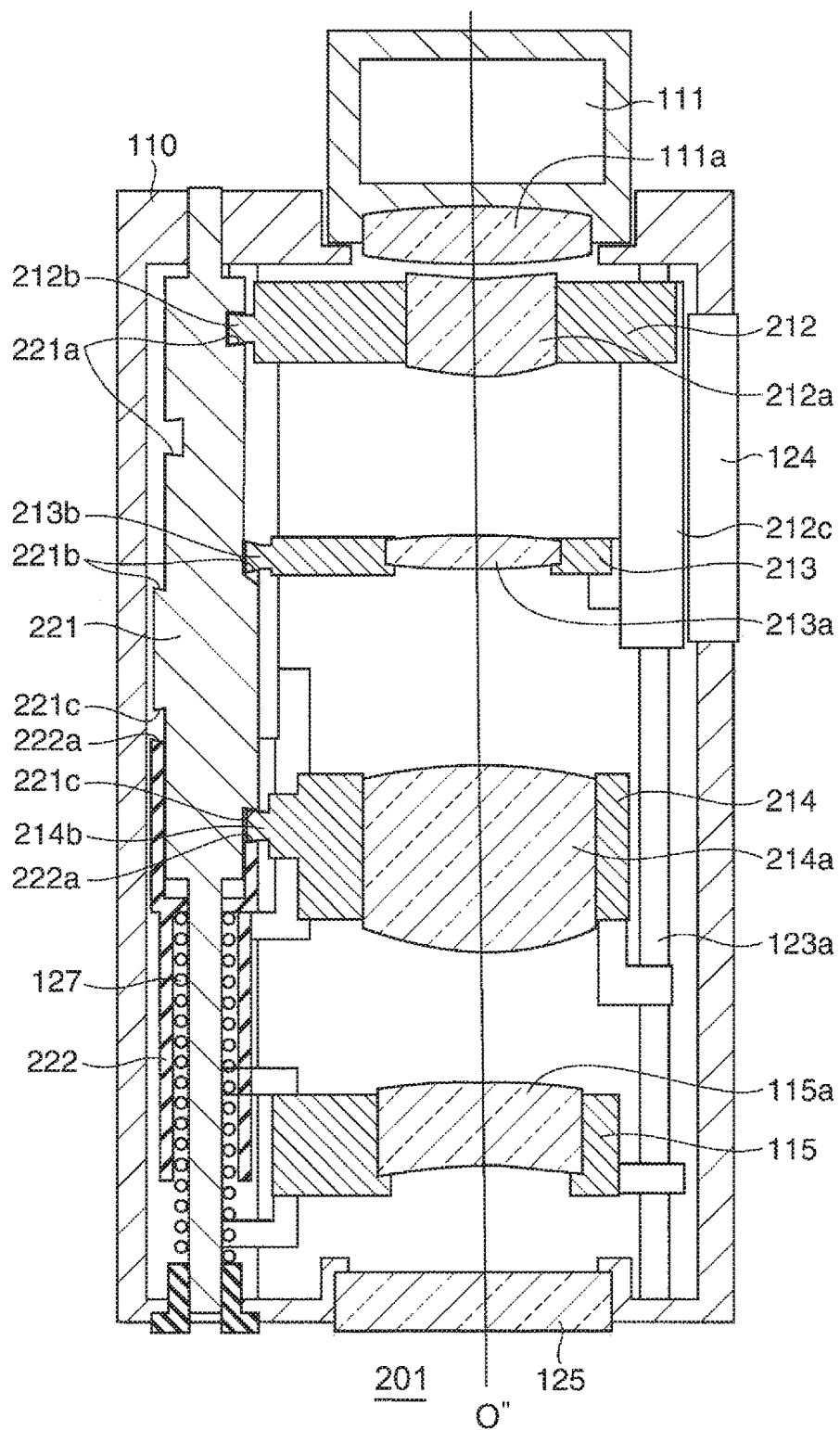
FIG. 14 is a schematic cross-sectional view taken along the optical axis and showing a lens barrel according to a fourth embodiment of the present invention at a position of a camshaft.

Referring next to FIG. 14, a description will be given of a lens barrel according to a fourth embodiment of the present invention. FIG. 14 is a schematic cross-sectional view taken along an optical axis O" of the lens barrel 201 and showing the lens barrel at a position of a camshaft 221. It should be noted that elements in the present embodiment corresponding to those of the third embodiment described above are designated by the same reference symbols, and only points of difference will be described below.

As shown in FIG. 14, the lens barrel according to the present embodiment has the first optical unit 111 fixed to the housing case 110, second to fourth optical units 212 to 214 movable in a direction of the optical axis O" of the lens barrel 201, and the fifth optical unit 115. The lens barrel 201 also has the camshaft 221, an urging cam 222, and the guide bars 123a and 123b. The camshaft 221, the urging cam 222, and the guide bars 123a and 123b are disposed parallel to the optical axis O", and the camshaft 221 and the urging cam 222 are rotatably supported by the housing case 110.

The first optical unit 111 is the same as that of the third embodiment described above. As with the third embodiment described above, the second optical unit 212 holds a second lens group 212a and is supported movably in the direction of the optical axis. A first follower 212b which is to be engaged with a first cam portion 221a provided in the camshaft 221 is provided in an outer peripheral portion of the second optical unit 212. As distinct from the third embodiment described above, the first follower 212b is shaped like a cylindrical wedge the diameter of which increases toward an outer side.

As with the third embodiment described above, the third optical unit 213 holds a third lens group 213a and is supported movably in the direction of the optical axis. A second follower 213b which is to be engaged with a second cam portion 221b provided in the camshaft 221 is provided in an outer peripheral portion of the third optical unit 213. The second follower 213b is shaped like a cylindrical wedge the diameter of which increases toward an outer side as with the first follower 212b. As with the third embodiment described above, the second follower 213b is urged downward as viewed in FIG. 14 and thus kept in contact with the second cam portion 221b of the camshaft 221.

As with the third embodiment described above, the fourth optical unit 214 holds a fourth lens group 214a and is supported movably in the direction of the optical axis. A third follower 214b which is to be engaged with a third cam portion 221c provided in the camshaft 221 is provided in an outer peripheral portion of the fourth optical unit 214. The third follower 214b is shaped like a cylindrical wedge the diameter of which increases toward an outer side as with the first follower 212b.

The third follower 214b of the fourth optical unit 214 is held in a state of being sandwiched between the third cam portion 221c and the urging cam 222. This keeps the third follower 214b in contact with the third cam portion 221c, and as the camshaft 221 rotates, the third follower 214b is able to move in the direction of the optical axis O" by following a surface of the third cam portion 221c. The fifth optical unit 115 is a focus lens group as with the third embodiment described above.

As with the third embodiment described above, the camshaft 221 has a stepped axial shape, and the first cam portion 221a, the second cam portion 221b, and the third cam portion 221c are provided in an outer peripheral portion of the camshaft 221. The first cam portion 221a is shaped like a groove, and the first follower 212b provided in the second optical unit 212 is engaged with the first cam portion 221a in a state of being supported by two surfaces such that the first follower 212b is fitted in the groove.

As described earlier, the first follower 212b is shaped like a cylindrical wedge, and the first cam portion 221a with which the first follower 212b is to be engaged is also grooved like a wedge the diameter of which decreases toward an outer peripheral portion. Further, the second cam portion 221b is provided in the camshaft 221 at a different diameter from a diameter at which the first cam portion 221a is provided, and a cam surface of the second cam portion 221b is formed on a side on which there is the first cam portion 221a. The second cam portion 221b is formed by a wedge surface corresponding to the wedge shape of the second follower 213b which is to be engaged with the second cam portion 221b.

Further, the third cam portion 221c is at substantially the same diameter as the diameter at which the second cam portion 221b is provided and is formed by a surface on an opposite side of the second cam portion 221b of the camshaft 221. As with the second cam portion 221b, the third cam portion 221c is formed by a wedge surface corresponding to the wedge shape of the third follower 214b which is to be engaged with the third cam portion 221c.

The urging cam 222 is placed coaxially with the camshaft 221 and has on an inner side thereof the second spring 127. A third B cam 222a which takes the same path as that taken by the third cam portion 221c of the camshaft 221 is provided at an upper end of the urging cam 222, and the third B cam 222a is formed by a wedge surface corresponding to the wedge shape of the third follower 214b.

Paths taken by the first to third cam portions 221a to 221c of the camshaft 221 when developed at a predetermined diameter are the same as those of the camshaft 121 of the third embodiment (FIG. 11) described above. Namely, the first cam portion 221a and the second cam portion 221b are formed by rotational die-cutting using an integral die piece. The camshaft 221 and the cam shaft 121 of the third embodiment described above differ in movement path and the camshaft 221 having a wedge shape in cross section as seen from the vertical direction. Thus, when a die is used from a radial direction of the wedged camshaft 221, the camshaft 221 cannot be molded because it is undercut. As shown in FIG. 12 and FIG. 13, by performing rotational die-cutting so as to create the first cam portion 221a and drawing the second cam portion 221b and the third cam portion 221c, which are comprised of surfaces, in a direction of a rotational axis, the camshaft 221 is molded without being undercut.

As a result, once the first cam portion 221a and the first follower 212b have been inserted from an end, there is no possibility of the first follower 212b falling off the first cam portion 221a while the camshaft 221 is rotating. Likewise, the second follower 213b and the third follower 214b are prevented from easily falling off the second cam portion 221b and the third cam portion 221c. As a result, even when the camshaft 221 is deformed because the lens barrel is subjected to external force due to drop, shock, or the like, the first to third followers 212b, 213b, and 214b resist falling off the first to third cam portions 221a to 221c.

Since the camshaft 221 of the present embodiment is molded by rotational die-cutting, the cam portions have wedged grooves with their groove width wider on a rear side (an inner diameter side) than at an entrance (an outer diameter side). It should be noted that although in the present embodiment, all of the first to third cam portions 221a to 221c have a wedge shape in cross section, only a part of them may have a wedge shape in cross section.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-045642, filed Mar. 9, 2016 and No. 2016-218973, filed Nov. 9, 2016 which are hereby incorporated by reference herein in their entirety.

What is claimed is:

1. A lens barrel comprising:
a first optical member configured to move in a direction of an optical axis of the lens barrel;
a second optical member configured to move in the direction of the optical axis;
a cam member configured to be cam-engaged with each of said first optical member and said second optical member and be held rotatably about a cam axis parallel to the optical axis; and
a linear actuator configured to drive said first optical member,
wherein said cam member is rotated by a cam action of said cam member and said first optical member, which is driven to move in the direction of the optical axis by said linear actuator,
wherein rotation of said cam member causes said second optical member to move in the direction of the optical axis due to a cam action of said second optical member and said cam member, and
wherein said cam member is disposed in an outer peripheral portion of the first optical member.

2. The lens barrel according to claim 1,
wherein a first cam groove with which a cam pin constituting said first optical member is to be engaged, and a second cam groove with which a cam pin constituting said second optical member is to be engaged are formed in said cam member, and
wherein a cam inclination of the first cam groove is greater than a cam inclination of the second cam groove.

3. The lens barrel according to claim 1, further comprising a guide bar configured to guide each of said first optical member and said second optical member in the direction of the optical axis,
wherein said cam member, said guide bar, and said linear actuator are placed in one direction perpendicular to the optical axis.

4. The lens barrel according to claim 1, wherein a direction in which said first optical member moves with respect to said cam member when said first optical member moves from a wide-angle position to a telephoto position is only one direction.

5. An image pickup apparatus having a lens barrel according to claim 1.

6. The lens barrel according to claim 1, wherein the cam axis is arranged at an opposite position to said linear actuator with the optical axis as a center.

7. A lens barrel that changes shooting magnifications from a wide-angle position to a telephoto position by moving at least a first optical member and a second optical member in a direction of an optical axis of the lens barrel, comprising:
a cam member configured to be rotatable through more than 120 degrees, and have, in an outer peripheral portion thereof, a first cam groove with which the first optical member is to be engaged, and a second cam groove with which the second optical member is to be engaged; and a drive unit configured to rotate said cam member,
wherein the first optical member and the second optical member move in the direction of the optical axis as said cam member rotates,
wherein a movement path taken by the first cam groove, when developed at a predetermined diameter, is a straight line inclined at a predetermined inclination with respect to a direction perpendicular to the optical axis, wherein the first cam groove has a groove shape with two surfaces thereof engaged with a a cam pin of the first optical member, wherein a movement path taken by the second cam groove, when developed at the predetermined diameter, nonlinear, wherein the second cam groove comprises a convex portion having a surface provided on a side on which the first cam groove is provided, the surface being engaged with a cam pin of the second optical member, and wherein a diameter at which the first cam groove of said cam member is formed and a diameter at which the second cam groove of said cam member is formed are different from each other.

8. The lens barrel according to claim 7, wherein said cam member is disposed in an outer peripheral portion of the first optical member and the second optical member and has a stepped axial shape.

9. The lens barrel according to claim 7, wherein one of the first cam groove and the second cam groove has a wedge shape with a groove width becoming wider toward a center of rotation of said cam member.

10. A lens barrel comprising:
a first optical member configured to move in a direction of an optical axis of the lens barrel;
a second optical member configured to move in the direction of the optical axis;
a cam member configured to be cam-engaged with each of said first optical member and said second optical member and be held rotatably about a cam axis parallel to the optical axis; and
an actuator configured to drive said first optical member,
wherein said cam member is rotated by a cam action of said cam member and said first optical member, which is driven to move in the direction of the optical axis by said actuator,
wherein rotation of said cam member causes said second optical member to move in the direction of the optical axis due to a cam action of said second optical member and said cam member,
wherein the cam member has, formed thereon, a first cam-engagement member with which a second cam-engagement member constituting said first optical member is to be engaged, and a third cam-engagement member with which a fourth cam-engagement member constituting said second optical member is to be engaged, and wherein a cam inclination of the first cam-engagement member is greater than a cam inclination of the third cam-engagement member.

11. the lens barrel according to claim 10, wherein each of the first cam-engagement member and the third cam-engagement member comprises a cam groove, and each of the second cam-engagement member and the fourth cam-engagement member comprises a cam pin.

12. The lens barrel according to claim 10, wherein the lens barrel is configured to change shooting magnifications from a wide-angle position to a telephoto position by moving at least the first optical member and the second optical member in the direction of the optical axis of the lens barrel, wherein the first cam-engagement member comprises a first cam groove, and the third cam-engagement member comprises a second cam groove, wherein the lens barrel further comprises a drive unit configured to rotate said cam member.

13. The lens barrel according to claim 12,
wherein the first cam groove has a groove shape with two surfaces thereof engaged with the first optical member, and wherein the second cam groove comprises a convex portion having a surface provided on a side on which the first cam groove is provided, the surface being engaged with the second optical member.

14. The lens barrel according to claim 13, wherein the second cam groove has a fall-off preventive portion that prevents said second cam groove from being disengaged from the second optical member.

15. The lens barrel according to claim 12, wherein a diameter at which the first cam groove of said cam member is formed and a diameter at which the second cam groove of said cam member is formed are different from each other.

16. The lens barrel according to claim 12, wherein the first cam groove and the second cam groove are formed using one rotational die-cutting piece when said cam member is molded.

17. The lens barrel according to claim 12, wherein said cam member is disposed in an outer peripheral portion of the first optical member and the second optical member and has a stepped axial shape.

18. The lens barrel according to claim 12, wherein one of the first cam groove and the second cam groove has a wedge shape with a groove width becoming wider toward the cam axis of said cam member.

* * * * *